United States Patent
Chen et al.

(10) Patent No.: US 7,450,068 B2
(45) Date of Patent: Nov. 11, 2008

(54) PHASED ARRAY ANTENNA BEAM TRACKING WITH DIFFERENCE PATTERNS

(75) Inventors: Ming Chen, Bellevue, WA (US); Mark A. Curry, Lynnwood, WA (US); Kenneth G. Voyce, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/602,015

(22) Filed: Nov. 20, 2006

(65) Prior Publication Data
US 2008/0117105 A1    May 22, 2008

(51) Int. Cl.
G01S 5/02 (2006.01)
G01S 13/00 (2006.01)
G01S 13/08 (2006.01)
G01S 3/16 (2006.01)
H04B 7/00 (2006.01)

(52) U.S. Cl. .......................... 342/427; 342/78; 342/79; 342/90; 342/133; 342/139; 342/140; 342/383; 455/276.1

(58) Field of Classification Search ................ 342/383, 342/427, 78, 79, 90, 133, 139, 140
See application file for complete search history.

(56) References Cited

U.S. PATENT DOCUMENTS

| | | | | |
|---|---|---|---|---|
| 4,652,880 A | * | 3/1987 | Moeller et al. | 342/373 |
| 4,912,477 A | * | 3/1990 | Lory et al. | 342/373 |
| 5,027,125 A | * | 6/1991 | Tang | 342/368 |
| 5,030,960 A | * | 7/1991 | Bartley | 342/427 |
| 5,128,683 A | * | 7/1992 | Freedman et al. | 342/158 |
| 5,173,703 A | * | 12/1992 | Mangiapane et al. | 342/25 A |
| 5,225,839 A | * | 7/1993 | Okurowski et al. | 342/174 |
| 5,886,671 A | | 3/1999 | Riemer et al. | |
| 5,943,010 A | * | 8/1999 | Rudish et al. | 342/372 |
| 6,661,376 B2 | * | 12/2003 | Maceo et al. | 342/373 |
| 2002/0159672 A1 | * | 10/2002 | Fells et al. | 385/13 |
| 2002/0176605 A1 | * | 11/2002 | Stafsudd et al. | 382/106 |
| 2003/0160720 A1 | * | 8/2003 | Maceo et al. | 342/373 |
| 2005/0206563 A1 | * | 9/2005 | Guy | 342/372 |
| 2006/0114164 A1 | | 6/2006 | Duz et al. | |
| 2006/0246863 A1 | * | 11/2006 | Reed | 455/276.1 |

OTHER PUBLICATIONS

M. Chen et al., A 20-GHz Active Receive Phased Array Antenna for Navy Surface Ship Satellite Communications Applications, Boeing Phantom Works, Seattle, Washington, 0-7803 5639-X/99, 1999 IEEE, pp. 2310-2313.

* cited by examiner

Primary Examiner—Thomas H. Tarcza
Assistant Examiner—Harry Liu
(74) Attorney, Agent, or Firm—Gates & Cooper LLP

(57) ABSTRACT

A system and method for using a phased array antenna to concurrently receive an RF signal transmitted by a remote transmitter, to determine the angular location of the remote transmitter using the transmitted signal, and to use that angular location to direct a transmit antenna to transmit information in the direction of the transmitter is disclosed.

17 Claims, 12 Drawing Sheets

PHASED ARRAY ANTENNA BEAM TRACKING WITH DIFFERENCE PATTERNS

BACKGROUND OF THE INVENTION

1. Field of the Invention

The present invention relates generally to phased array antennas, and in particular to a system and method for tracking sources of radio frequency communication signals using phased array antennas.

2. Description of the Related Art

Phased array antennas are commonly used in both radar and communications applications. Phased array antennas comprise a plurality of elements coupled to a common source or load to produce a directive radiation pattern. The relative phases of the respective signals feeding the plurality of elements are varied in such a way that the effective radiation pattern of the array is reinforced in a desired direction and suppressed in undesired directions. Typically, such antennas produce a main lobe beam and two or more side lobes. Also, the sensitive axis of such antennas can be steered by controlling the phase between the plurality of elements using variable phase shifters.

The ability to electronically steer the beam of a phased array antenna provides many advantages (beam steering agility, speed, low observables, low profiles, and low maintenance) over its traditional, mechanically steered counterparts. But while the phased array antenna can be electronically steered to transmit or receive a beam in a particular direction, such antennas still require information regarding the direction in which the transmitting antenna must steer the beam in order to accurately direct the beam energy at the desired targets and to track such targets. This problem is especially important where the phased array antennas are used to transmit and receive communication signals between multiple objects at long distances or where low observables are important. Because such situations typically require relatively narrow antenna beamwidths and high agility, it is important to determine the location of the other object being communicated with as quickly and accurately as possible.

Current communications systems using phased array receive antennas use closed-loop tracking control techniques such as conical scan or sequential lobing to obtain the pointing information required to direct the associated transmit antenna beams in the desired direction. They also use open-loop tracking control techniques, with the pointing information provided by other systems such as navigation and inertial measurement systems.

When conical scanning a phased array communication antenna, the beam of the receive antenna is slightly offset from the antenna's nominal direction, then circularly rotated, thus producing in a shape akin to a cone between the antenna and the target. Ideally, a target transmitter located at the center of a conical scan will generate a constant return at all points in the conical scan, because the target transmitter will be offset from boresight by the same amount during the entire scan. However, when the target transmitter is not centered, the off-axis gain characteristic of the main lobe of the antenna will cause the return to vary in intensity or disappear altogether for short periods during the scan. The strength of the return is indicative of how close the center of the scan is to the actual target location, and this information can be used to direct the transmit antenna to the proper orientation. Sequential lobing is conceptually similar to conical scanning, except that measurements are taken at discrete positions rather than a continuous scan.

While conical scan or sequential lobing techniques are effective, they have a relatively slow response time. In particular, the conical scan controller often cannot operate fast enough to ensure adequate tracking when the communications platform is rolling higher rates, including those in the order of 10 degrees per second or more.

What is needed is a system and method for using a phased array receive antenna to concurrently receive a signal transmitted by a remote transmitter, to determine the angular location of the remote transmitter using the transmitted signal, and to use that angular location to direct a transmit antenna to transmit information in the direction of the transmitter. The present invention satisfies these needs.

SUMMARY OF THE INVENTION

To address the requirements described above, the present invention discloses a device for receiving a radio frequency (RF) communication signal transmitted from a source and concurrently determining the direction of the source. The device comprises a phased array antenna disposed in a plane, the phased array antenna for receiving the communication signal at an angle offset from a boresight vector extending from the plane, the phased array antenna. The phased array comprises a first subarray and a second subarray. The first subarray has a first group of elements, each element of the first group of elements for receiving the RF signal, and a first subarray summer, coupled to each of the elements in the first group of elements, the first subarray summer for generating a first subarray output (A) from the sum of the RF signals received by each of the elements in the first group of element, and the second subarray has a second group of elements, each element of the second group of elements for receiving the RF signal and a second subarray summer, coupled to each of the elements in the first group of elements, the second array summer for generating a second sub array output (B) from the sum of the RF signals received by each of the elements in the second group of elements. In one embodiment, the first subarray and the second subarray are of (n×m) dimension wherein n is the number of rows of elements and m is the number of columns, and wherein $n \geq 2$ and $m \geq 2$. The phased array also comprises a combining network, coupled to the first array sum output and the second array sum output. The combining network generates a combining network output that comprises an array output representing the received signal as the sum of the first subarray output, the second subarray output (A+B) and an error signal proportional to the angle offset from the boresight vector extending from the plane, the error signal generated as a difference between the first subarray output and the second subarray output. This error signal can be used to steer the transmit antenna to direct it at to the angular location of the received communication signal.

In another embodiment, the present invention is evidenced by a method for receiving a radio frequency signal transmitted from a source offset from a boresight vector extending from the plane and concurrently generating an error signal proportional to the angle. The method comprises the steps of summing an output of a first group of elements in a first subarray having (n×m) elements wherein $n \geq 2$ and $m \geq 2$, summing an output of a second group of elements in a second subarray having (n×m) elements wherein $n \geq 2$ and $m \geq 2$, summing the output of the first group of elements in the first subarray and the output of the second group of elements in the second subarray to produce an array output representing the received radio frequency signal, and differencing the output of the first group of elements in the first subarray and the output of the second group of elements in the second subarray to generate the error signal.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
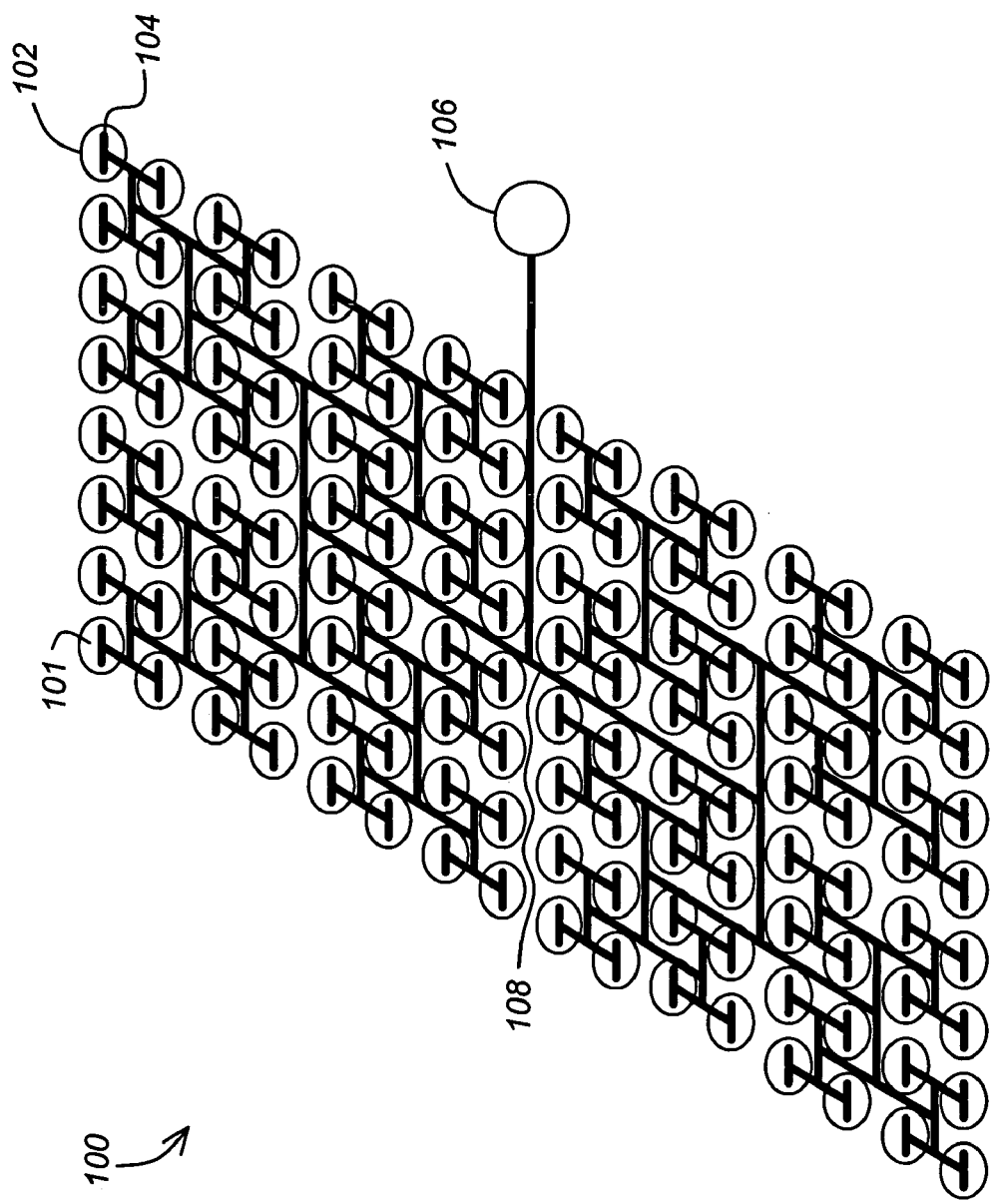
FIG. 1 is a diagram depicting an exemplary subarray of a phased array antenna.

FIG. 1 is a diagram depicting an exemplary subarray 100 of a phased array antenna. The subarray 100 includes a first group of elements 101 for receiving a radio frequency signal (RF). The elements are arranged in n rows and m columns and are dimension (n×m) wherein n and m≧2 (a single row or column of elements 101 do not together form a subarray 100). Each of the elements 101 includes a waveguide 102 and a terminator 104 such as a dipole which senses the RF energy. The outputs from each element 101 are summed together in phase by summer 108 (in the illustrated embodiment, the network linking the elements) and provided to a subarray output 106.

Figure 2:
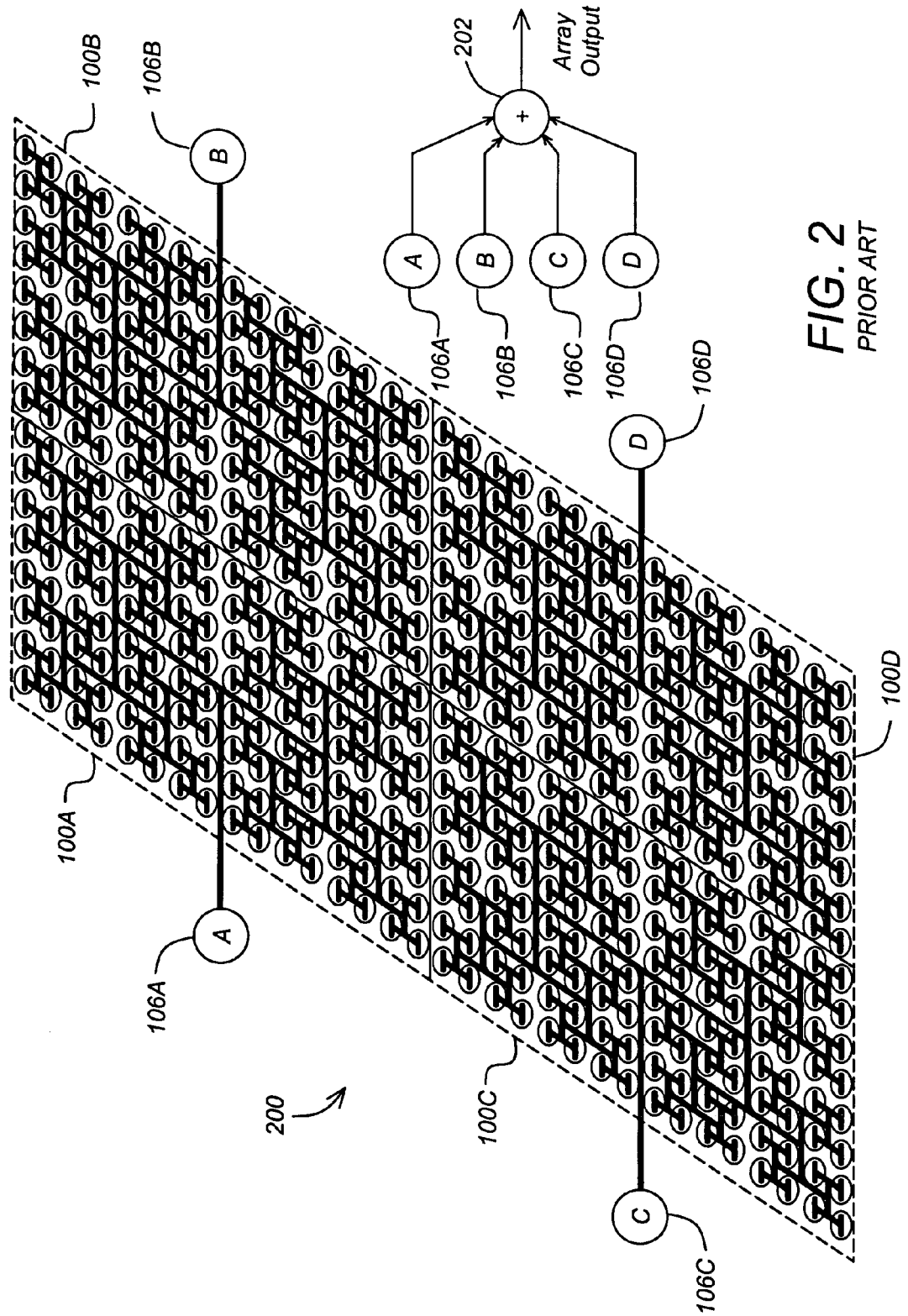
FIG. 2 is a diagram depicting an exemplary phased array antenna.

FIG. 2 is a diagram depicting an exemplary phased array antenna 200. The phased array antenna 200 comprises a plurality of subarrays 100, including subarrays 100A, 100B, 100C, and 100D. Each of the subarrays 100 includes a subarray output 106A, 106B, 106C, and 106D, respectively, which provides the sum of the signals at each element 101 of the phased array antenna 200. The phased array antenna 200 can be used to transmit or receive signals. When used to receive a radio frequency (RF) signal, the phased array antenna 200 output is formed by the sum of the output of each of the subarrays 106A, 106B, 106C, and 106D, using summer 202.

Figure 3:
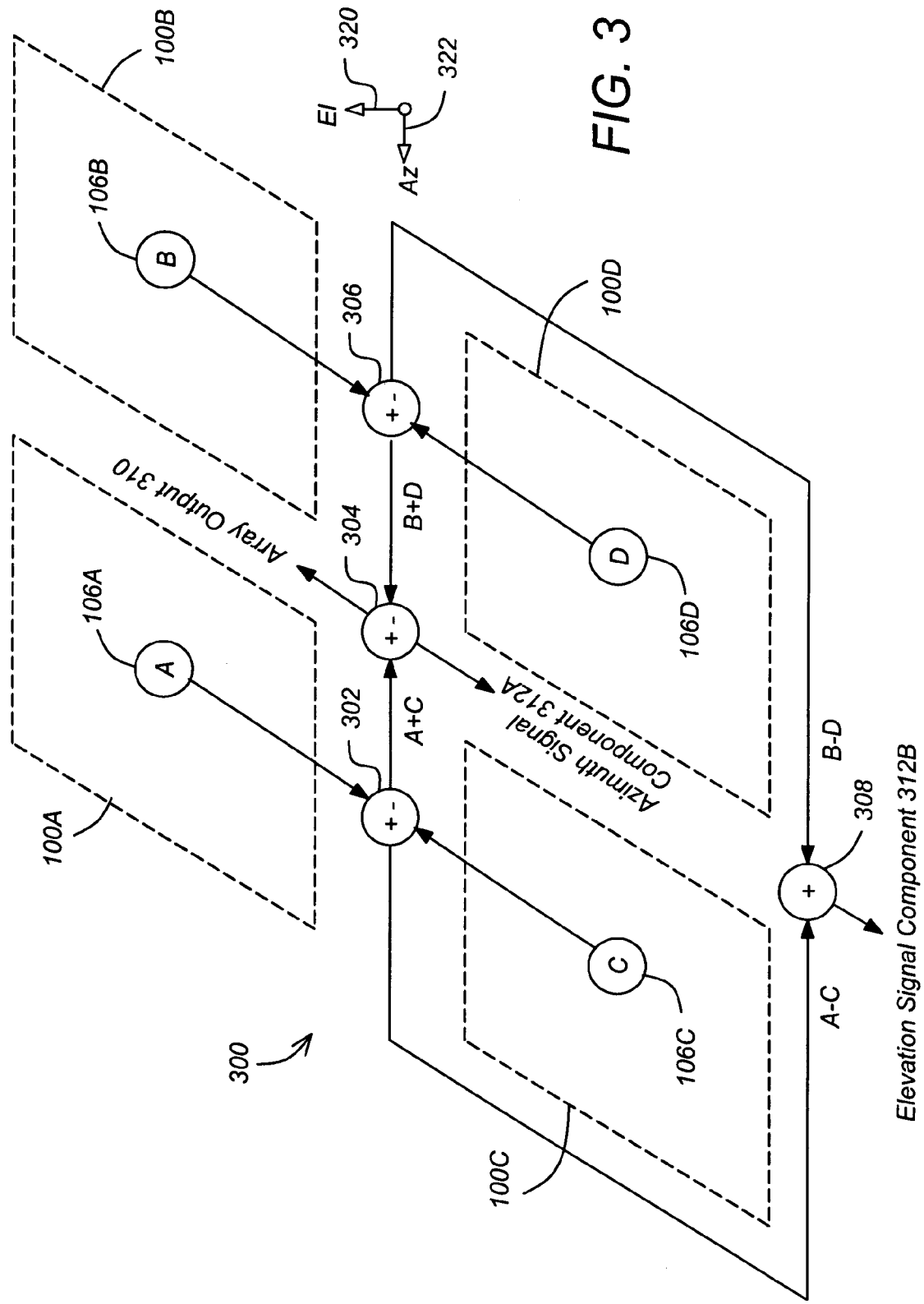
FIG. 3 is a diagram showing one embodiment of a phased array antenna that generates an error signal proportional to the off-boresight angle $\epsilon$ to the source of the received RF energy.

FIG. 3 is a diagram showing one embodiment of a phased array antenna 300 that generates an error signal proportional to an angle offset from a boresight vector (alternatively referred to as the off-boresight angle $\epsilon$) to the source of the received RF energy. For purposes of simplicity, this diagram illustrates the subarrays 100 but does not illustrate the elements 101 that were illustrated in FIG. 2. In this embodiment, the subarray outputs 106A-106D are combined to not only generate the array output 310 as the sum of the subarray outputs 106A-106D (which is the received RF signal), but also, an error signal 312. In the illustrated embodiment the error signal 312 has an azimuth signal component 312A and an elevation signal component 312B, each corresponding to RF source location in the azimuth 322 and elevation 320 directions.

The error signal 312 is generated by a combining network, which, in the illustrated embodiment, is comprised of 0° hybrid combiner 308, 0°/180° hybrid combiners 302-306, and conductors interconnecting these combiners 302-308.

Hybrid combiner 302 has a first input coupled to the first subarray output 106A and a second input coupled to the third subarray output 106C, and generates a signal proportional to the difference between the output 106A of the first subarray 100A and the output 106C of the third subarray 100C (A−C) and also a signal proportional to the sum of the output 106A of the first subarray 100A and the output 106C of the third subarray 100C (A+C).

Hybrid combiner 306 has a first input coupled to the second subarray output 106B and a second input coupled to the fourth subarray output 106D, and generates a signal proportional to the difference between the output 106B of the second subarray 100B and the output 106D of the third subarray 100D (B−D) and also a signal proportional to the sum of the output 106B of the second subarray 100B and the output 106D of the fourth subarray 100D (B+D).

Hybrid combiner 304 is coupled to hybrid combiners 302 and 306 and generates the array output 310 from the (A+C) signal from hybrid combiner 302 and the (B+D) signal from hybrid combiner 306 as (A+B+C+D). Hybrid combiner 304 also generates the azimuth component 312A of the error signal as a difference between the (A+C) signal from hybrid combiner 302 and the (B+D) signal from hybrid combiner 306.

Hybrid combiner 308 is coupled to hybrid combiners 302 and 306 and generates the elevation component 312B of the error signal 312 as a sum of the (A−C) signal from hybrid combiner 302 and the (B−D) signal from hybrid combiner 306.

Figure 4:
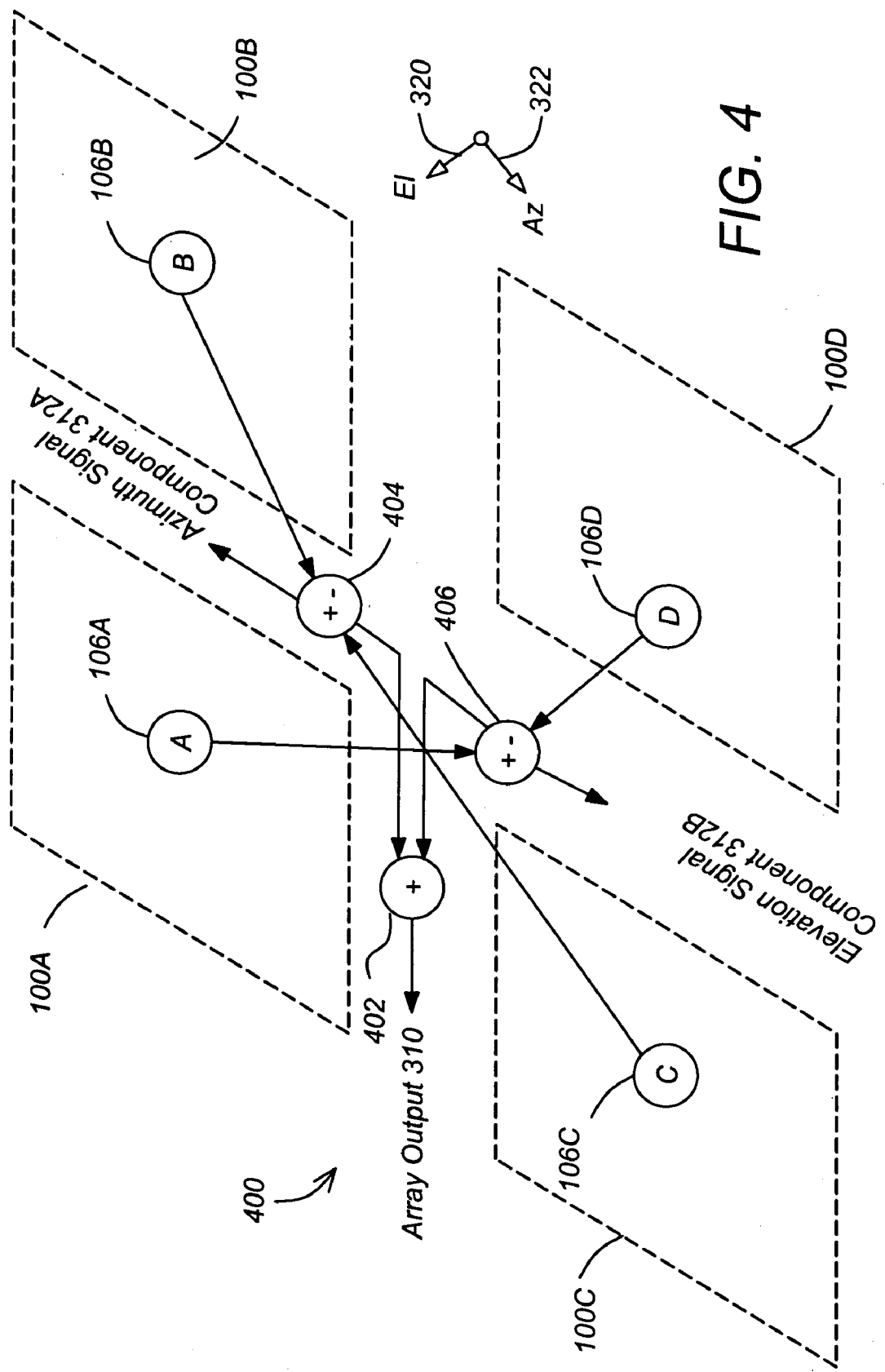
FIG. 4 is a diagram of an alternate embodiment of the phased array.

FIG. 4 is a diagram of an alternate embodiment of the phased array 400. In this embodiment, the subarrays 100 are reoriented so that signals from only two subarrays are required to determine the azimuth 312A and elevation 312B components of the error signal 312. In this embodiment, for example, the elevation error signal component 312B is computed simply as a difference between the signal from the first subarray output 106A and the second subarray output 106D (A−D), because the output of both second subarray output 106B and the third subarray output are insensitive to motion of the RF source in the elevation direction 320. Similarly, motion of the RF source in the azimuth direction 322 is determined by computing a difference between the second subarray output 106B and the third subarray output 106C (B−C), and the first subarray output 106A and fourth subarray output 106D are insensitive to RF source motion in the azimuth direction 322.

Accordingly, the combining network of this embodiment comprises a first hybrid combiner 406 that is coupled to compute a difference between the first subarray output 106A and the fourth subarray output 106D as the elevation error signal component 312B and a second hybrid combiner 404 that is coupled to compute a difference between the second subarray output 106B and the third subarray output 106C (B−C) as the azimuth error signal component 312B. The array output 310 is computed as the sum of all of the subarray outputs 106A-106D (A+B+C+D).

Note that while FIGS. 3 and 4 illustrate embodiments wherein the error signal 312 includes two components 312A, 312B, the same principles can be used to generate a single component error signal (an error signal for only azimuth, elevation, or in a single direction having both azimuth and elevation components). In this case, only two subarrays 100 are required to generate an error signal. For example, if only the angular offset between a boresight vector perpendicular to the plane defined by subarrays 100A and 100D were desired (in FIG. 4, the offset in elevation only), only A−D need be computed.

The foregoing principles can be extended to include embodiments incorporating greater numbers of subarrays 100 as well.

Figure 5:
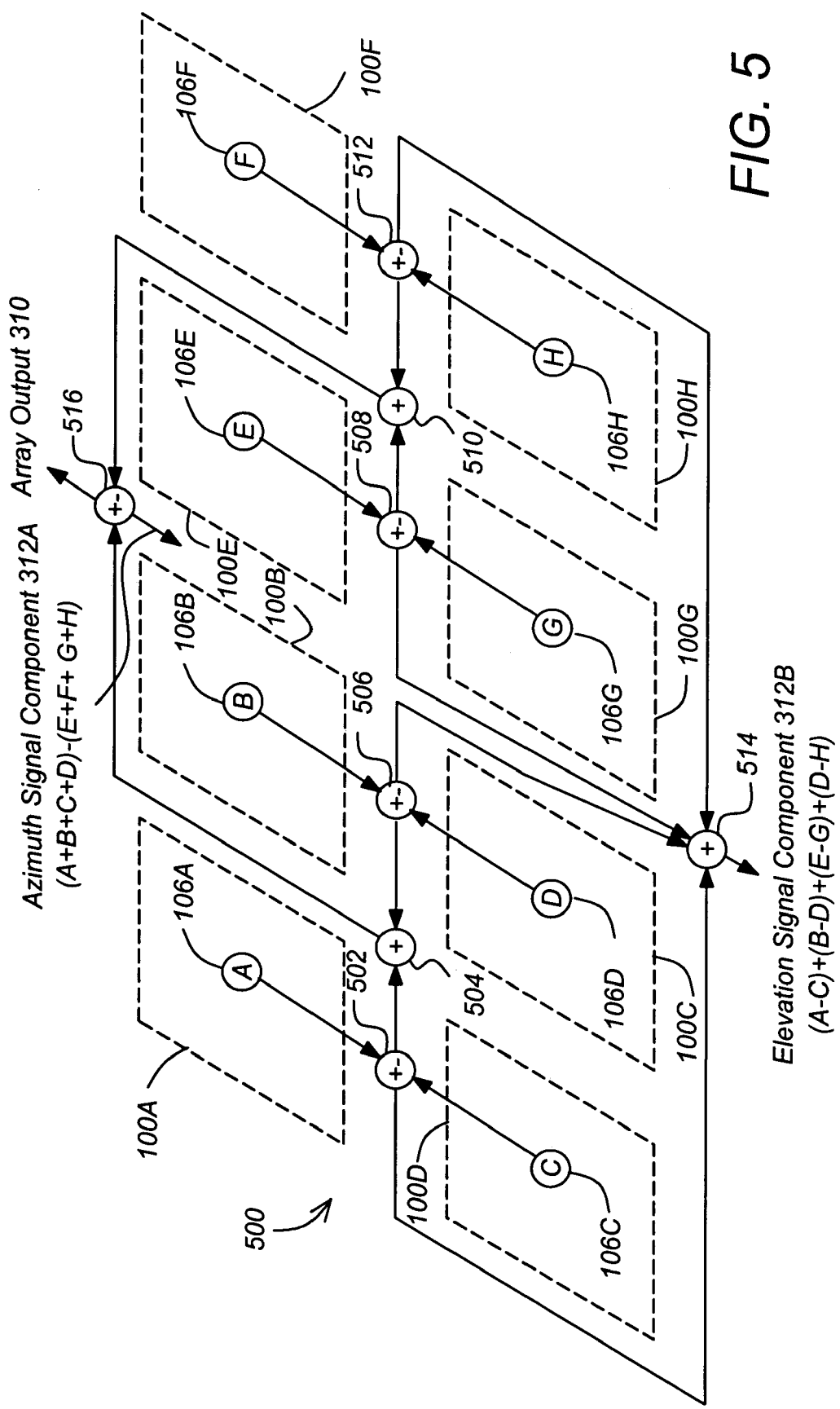
FIG. 5 is a further embodiment of a planar array that using eight subarrays to generate the array output and to compute the error signal.

FIG. 5 is a further embodiment of a planar array 500 that using eight subarrays 100 to generate the array output 310 and to compute the error signal 312. This embodiment includes first, second, third and fourth subarrays 100A-100D described above, and also includes similarly constructed fifth, sixth, seventh, and eighth subarrays 100E-100F.

As before, the combining network is coupled to the outputs 106A-106H of each of the subarrays 100A-100H, and as before, the array output is computed as the sum of all of the subarray outputs 106A-106H (thus producing A+B+C+D+ E+F+G+H). However, in this embodiment, the combining network computes the elevation component of the error signal 312A by computing the sum of the differences between subarray 100 pairs arranged on top of one another (A−C)+(B−D)+(E−F)+(F−H), while the azimuth component is determined by computing the difference between the sum of a first group of subarrays 106A-106D and the second group of subarrays 106E-106H (A+B+C+D)−(E+F+G+H). The foregoing summing and differencing operations are provided by 0°/180° hybrid combiners 502, 506, 508, 512, and 516, and 0° hybrid combiners 504, 510, and 514.

Analogous results can also be obtained by computing the elevation component 312B of the error signal 312 as (A+B+ E+F)−(C+D+G+H) and the azimuth component 312A of the error signal 312 as (A+C)−(F+H)+(B+D)−(E+G) (e.g. taking the difference of the sum of the outputs of equidistant vertical disposed pairs of subarrays 100). The foregoing design could be expanded to include greater number of subarrays using analogous principles.

Figure 6:
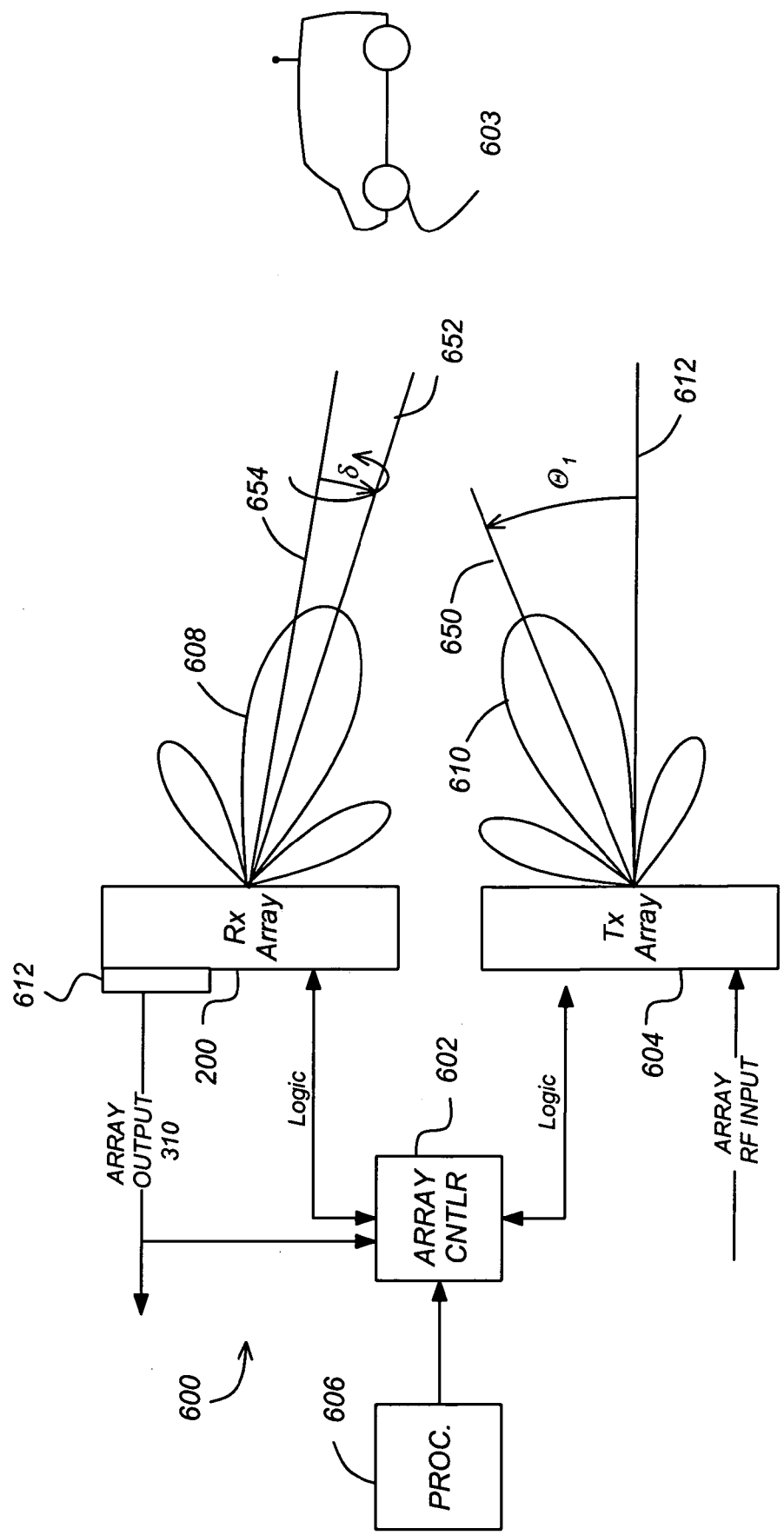
FIG. 6 is a diagram showing the conical scan technique applied to a receive antenna.

FIG. 6 is a diagram showing the conical scan technique applied to a receive antenna. In this application, conical scan and sequential lobing techniques can be used to determine the position of a radio frequency (RF) communication signals transmitted by transmitters located on the target 603, and use that information to direct the sensitive axis 650 of associated transmit antenna 604 at the target 603 to transmit information or illuminate the target 603.

This is accomplished by the use of the array controller 602 to command phase shifters in the receiver array 200 so as to electronically steer its sensitive axis 652 in a circle centered on the expected angular location 654 of the target 603, thereby creating a conical scan pattern. The RF signal transmitted by the target 603 is received by each of the elements in the receive array 200 and summed together to form the received RF signal or array output 310. This signal is both provided as the array output 310 and analyzed by the array controller 602 and used to generate a beam steering command that is provided to the transmit array 604 in order to direct the transmit array 604 at the target 603. Sequential lobing is also accomplished using similar techniques, but the sensitive axis 652 is directed to different discrete locations instead of a conical scan.

As described above, although these techniques are effective, they have a relatively slow response time. In particular, the conical scan controller often cannot operate fast enough to ensure adequate tracking when the communications platform is rolling higher rates, including those in the order of 10 degrees per second or more.

Figure 7A:
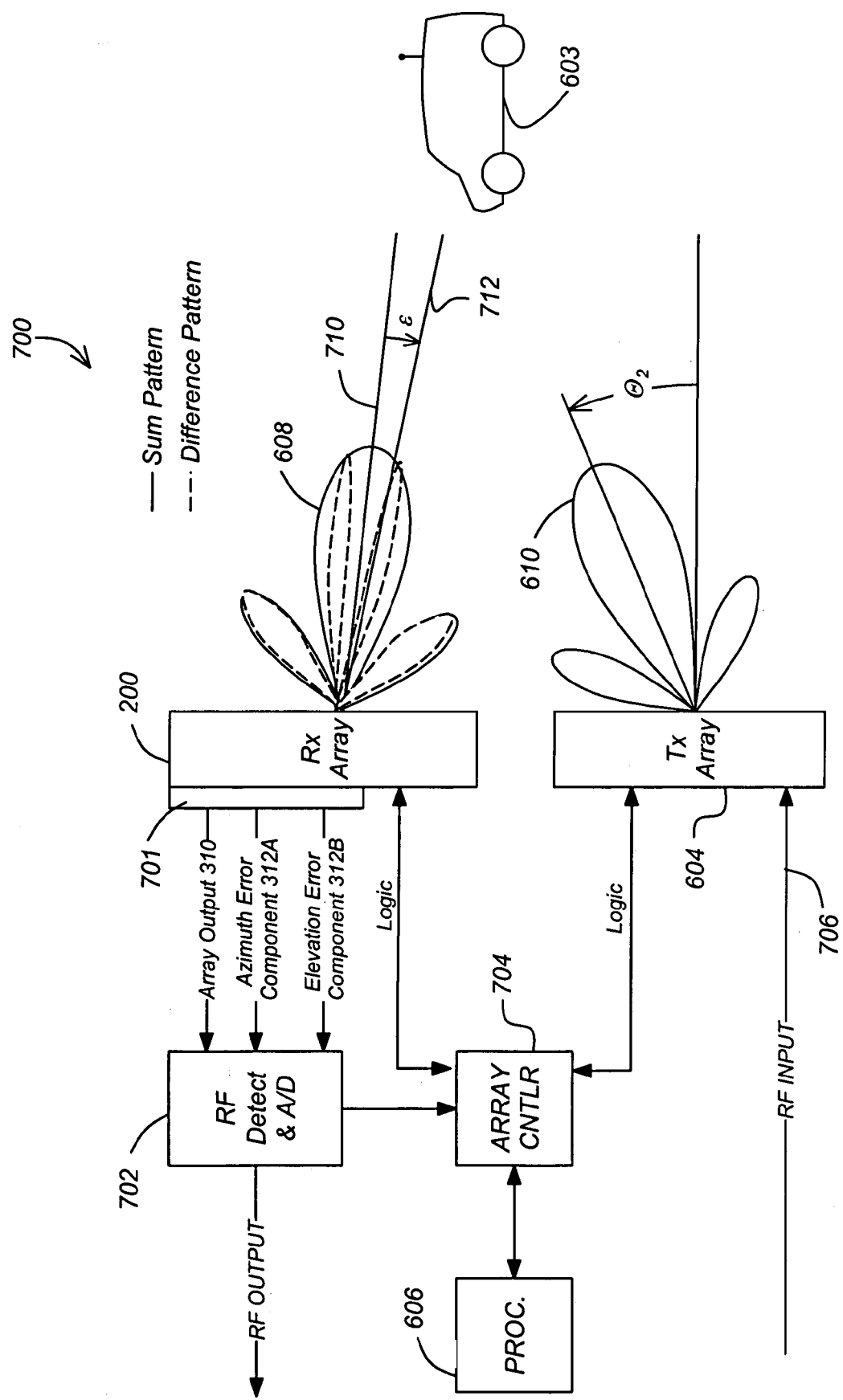
FIGS. 7A-7C are diagrams of improved phased array antenna pointing systems using the phased array designs shown in FIGS. 3-5.

FIG. 7A is a diagram of an improved phased array antenna pointing system 700 using the one of the phased array designs shown in FIGS. 3-5. In this embodiment, the combining network 701 generates not only an array output signal 310, but also one or more error signals 312 computed from the sum signal (corresponding to the sum pattern of the receive array 200) and the difference signal (corresponding to the difference pattern of the receive array 200). The error signal 312 is proportional to the angle $\epsilon$ offset from the boresight vector 710 extending from the plane of the receive array 200. These signals are provided to a receiver 702 which receives the signals, and provides the received error signals to the array controller 704 and RF signals to the communication system.

In the illustrated embodiment, the error signal 312 includes an azimuth error component 312A which is proportional to the angle offset between the boresight vector 710 and the vector 712 between the receive array 200 and the target 603, and an elevation error component 312B which is proportional to the angle offset between the boresight vector 710 and the vector 712. The azimuth and elevation error components 312A, 312B are provided to an array controller 704.

Using the received azimuth and elevation error components 312A, 312B, the array controller 704 and/or processor 706 generates one or more commands to steer the beam 610 of the transmit antenna array 604 at an angle $\theta_2$ toward the target 603, thus transmitting the signal present at the RF input 706 of the transmit antenna array 604 in the measured direction of the target 603. The array controller 704 may also optionally provide commands to the receive antenna array 200 to steer the beam 608 to direct the beam either at the target 603, or at the target's predicted position. Depending on the location of the transmit array 604 and the receive array 200, coordinate transformations can be made, using the known distance between the transmit array 604 and the receive array 200 and the orientation of the platform upon which the arrays 604, 200 are mounted. Such orientation information is typically available from the guidance, navigation, and control system of the platform The foregoing operations illustrate the task of determining the direction of a communication signal so that a beam 610 of a transmit antenna array 604 can be steered to transmit a related communications signal to the target 603. However, the present invention can be used to actively or passively determine the angular location of any source of RF energy, whether that source be reflected energy from a transmit array antenna 604 or the target 603 itself. It can also be used to steer either or both the receive antenna array's beam 608 and the transmit array antenna's beam 610, as desired.

Figure 7B:
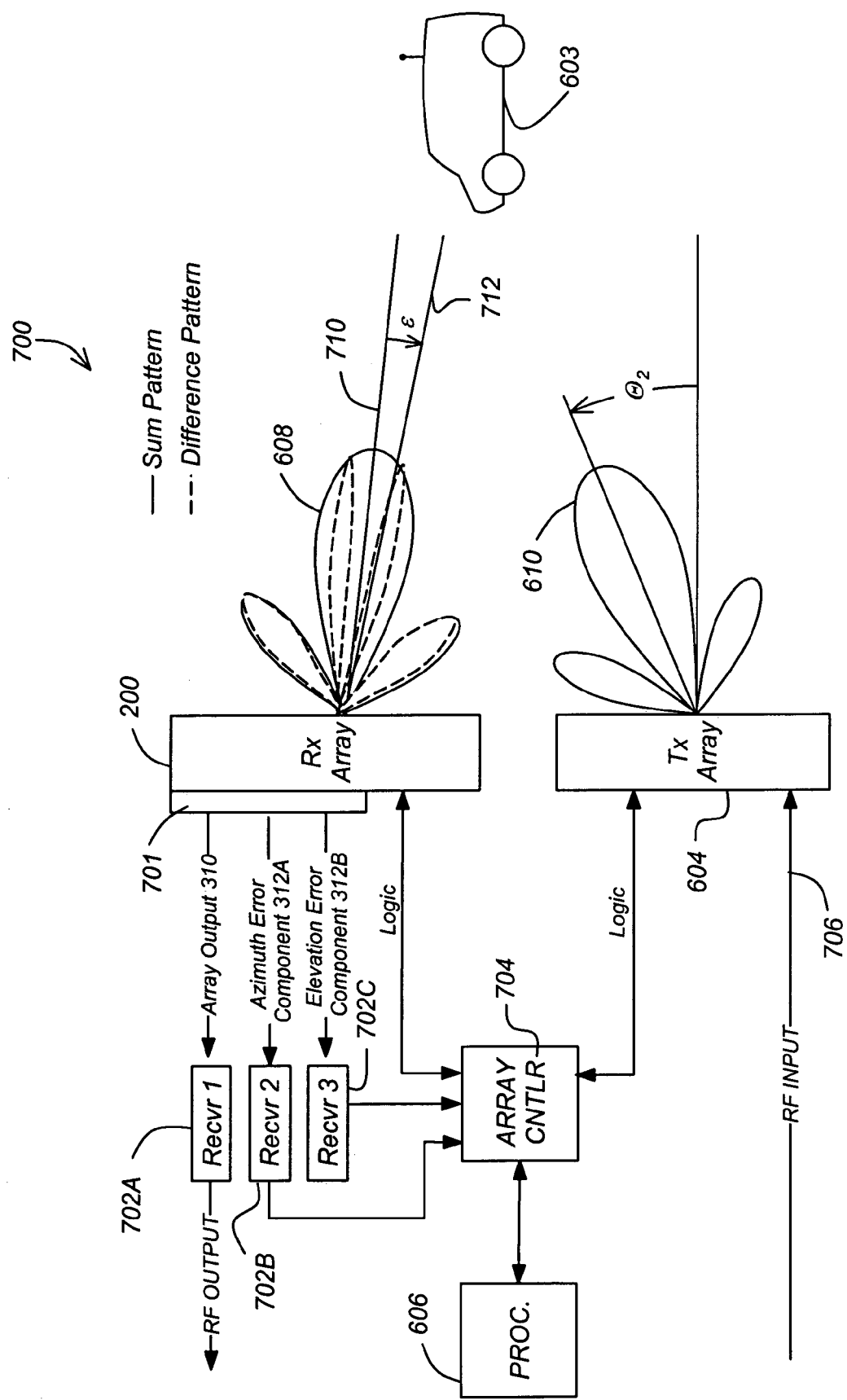

FIG. 7B is a diagram of another embodiment of the invention that is particularly well suited to application to communication systems. Typically, phased array antennas used for radar applications are narrowband and operate at modest distances between the radar system and the target. Communications systems, however, are typically wideband and operate at long distances between the transmitter and the receiver. As a consequence, the array output 310 is typically much greater in strength than the error signal 312 (by virtue of the output being derived from a sum of values, while the error signal is derived from a difference between values). While generally not problematic for phased arrays used in radar applications, the Applicants have determined it is to determine the magnitude of the array output 310 and the error signal 312 from communications signals with a single receiver. Accordingly, in this embodiment of the invention, separate receivers (702A-702C) are provided for the array output 310 and the error signal 312 (and where the system uses independent azimuth and elevation channels, separate receivers for each of the channels). In this embodiment, each receiver 702A-702C is dedicated to the task of receiving the array output 310 and error components 312A, 312B, respectively, permitting each receiver 702A-702C to use the proper detection and A/D scaling.

Figure 7C:
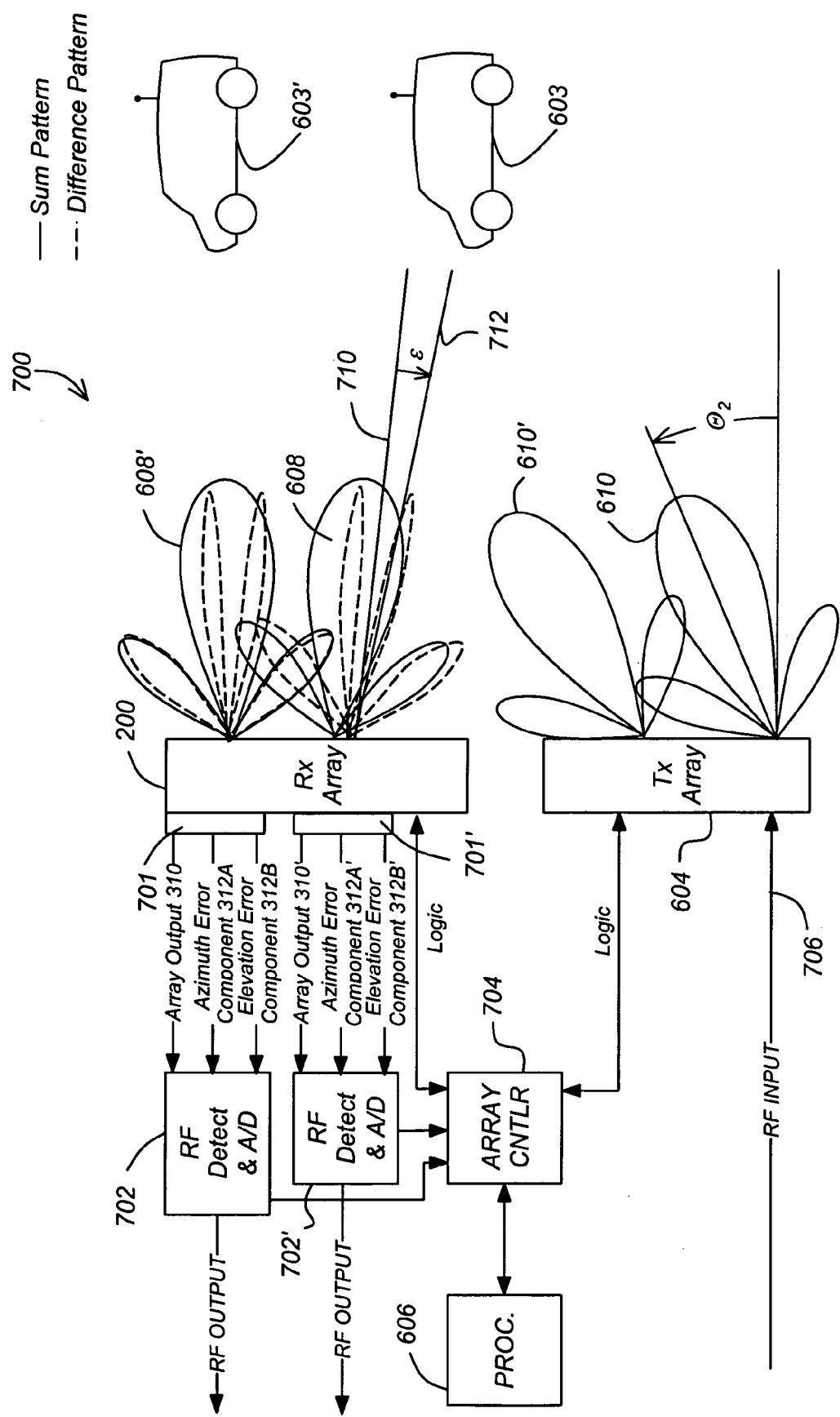

FIG. 7C is another embodiment of the present invention in which the phased array antenna 200 is used to simultaneously determine the position of a second RF communication signal transmitter or target 603'. In this embodiment, a second combining network 701' is used to generate a second array output 310', azimuth error component 312A', and elevation error component 312B' from signals received from the second RF communication signal transmitter 603 via second beam 608'. These values are provided to a second receiver 702' which receives the second error signals 312 and the array output 310. The second error signals 312 are provided to the array controller, which controls a second transmit beam 610' formed by transmit array 604.

Figure 8A:
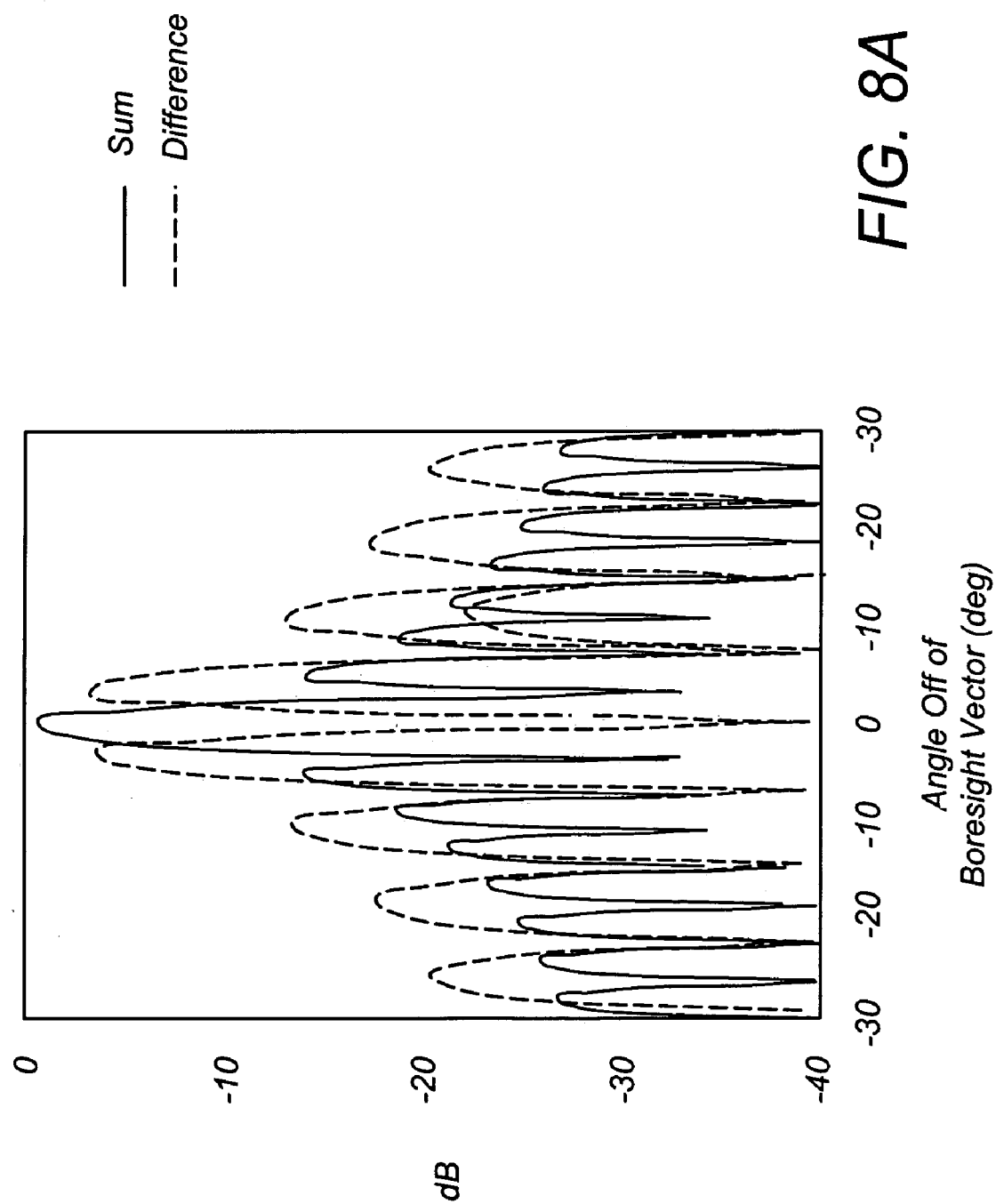
FIGS. 8A-8C are diagrams illustrating one embodiment of the derivation of the beam steering control signal.
Figure 8B:
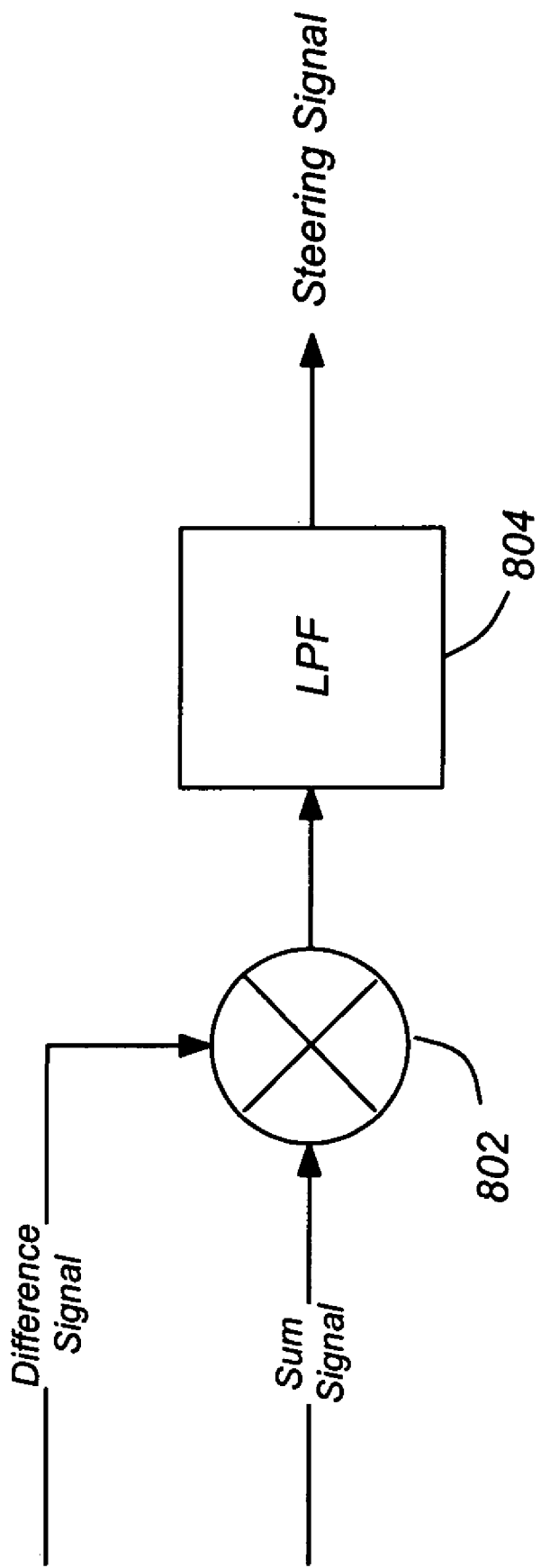
Figure 8C:
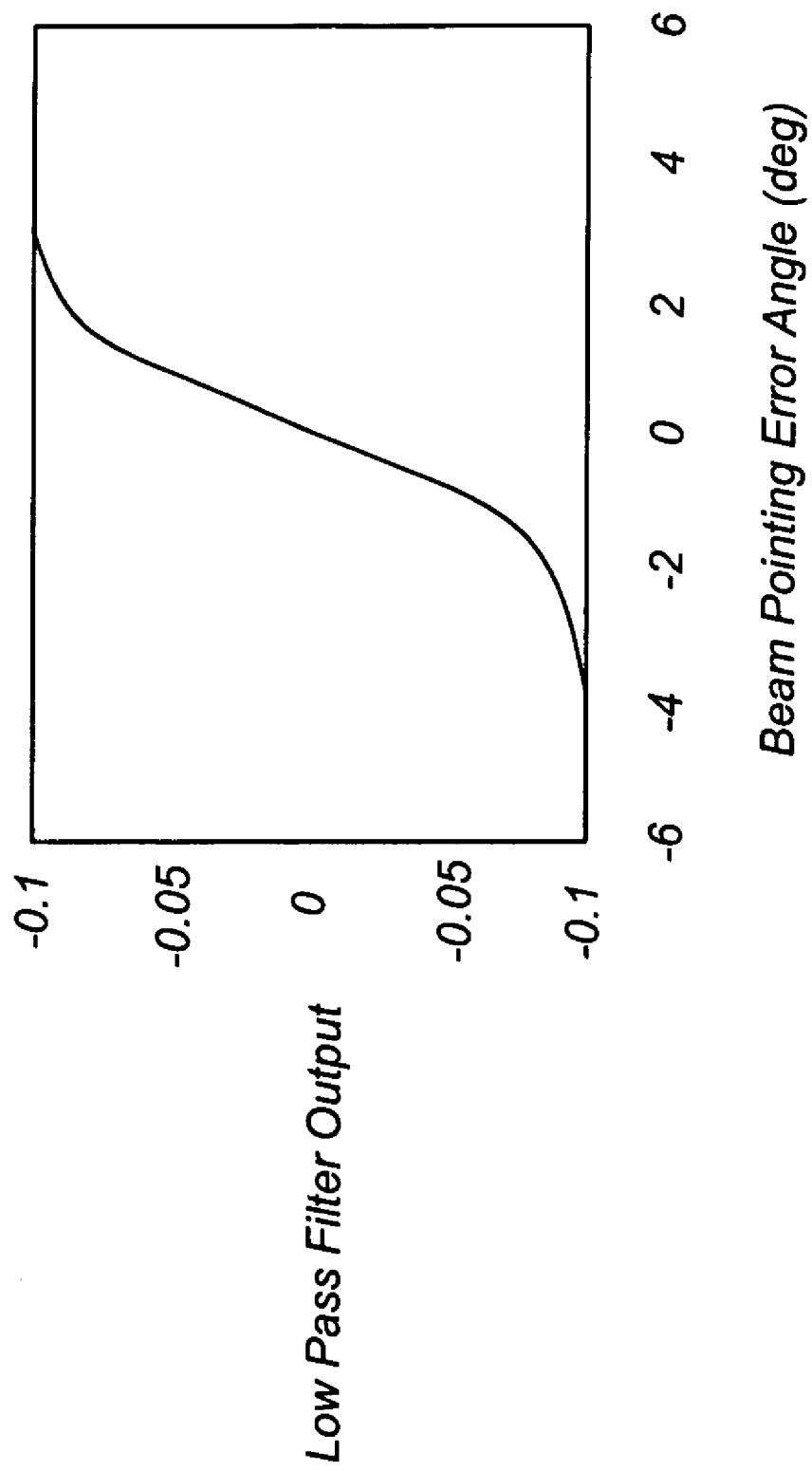

FIGS. 8A-8C are diagrams illustrating the derivation of the beam steering control signal. FIG. 8A is a diagram illustrating plot of the relative magnitude of the sum and difference signals from the combining network 701 for the pitch channel (movement in the plane of FIG. 7). The relative magnitude for the yaw channel is substantially similar. Since the sum and difference signals are coherent with each other, the multiplicative product of the two results in a DC component (assuming the target is not moving) that is positive if the beam steering angle is too great and negative if it is too small.

FIG. 8B is a diagram showing how the signals shown in FIG. 8A can be combined to produce the error signal in each channel. The difference signal and sum signals are provided to a multiplier 802 to produce the error signal. Preferably, the multiplier 802 output is provided to a low pass filter 802 having a bandwidth suitably selected to reduce noise without appreciably affecting the dynamics of the error signal. The result is an error signal that can be used for antenna steering control. A typical error signal characteristic is illustrated in FIG. 8C.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A device for receiving a radio frequency (RF) communication signal transmitted from a source and concurrently determining the direction of the source, comprising:
   a phased array antenna disposed in a plane, the phased array antenna for receiving the communication signal at an angle offset from a boresight vector extending from the plane, the phased array antenna comprising:
      a first subarray, having
         a first group of elements, each element of the first group of elements for receiving the RF signal; and
         a first subarray summer, coupled to each of the elements in the first group of elements, the first subarray summer for generating a first subarray analog RF output (A) from the sum of the RF signals received by each of the elements in the first group of elements;
      a second subarray, having
         a second group of elements, each element of the second group of elements for receiving the RF signal; and
         a second subarray summer, coupled to each of the elements in the first group of elements, the second array summer for generating a second sub array analog RF output (B) from the sum of the RF signals received by each of the elements in the second group of elements;
      a combining network, coupled to the first array sum analog RF output and the second array sum analog output, the combining network for generating a combining network output comprising:
         an analog RF array output representing the received signal as the sum of the first subarray output, the second subarray output (A+B); and
         an analog RF error signal proportional to the angle offset from the boresight vector extending from the plane, the error signal generated as a difference between the first subarray output and the second subarray output;
   a first receiver, communicatively coupled to the analog RF array output and an output of the phased array antenna; and
   a second receiver, communicatively coupled to the analog RF error signal and the array controller.

2. The apparatus of claim 1, further comprising:
   a third subarray, having
      a third group of elements, each element of the third group of elements for receiving the RF signal; and
      a third subarray summer, coupled to each of the elements in the third group of elements, the third subarray summer for generating a third subarray analog RF output (C) from the sum of the RF signals received by each of the elements in the third group of elements;
   a fourth subarray, having
      a fourth group of elements, each element of the fourth group of elements for receiving the RF signal; and
      a fourth subarray summer, coupled to each of the elements in the first group of elements, the fourth array summer for generating a fourth sub array analog RF output (D) from the sum of the RF signals received by each of the elements in the fourth group of elements; and
   wherein the third subarray and the fourth subarray are of (n×m) dimension wherein n is the number of rows of elements and m is the number of columns, and wherein $n \geq 2$ and $m \geq 2$;
   wherein the first subarray is disposed adjacent the second subarray and the third subarray, the second subarray is disposed adjacent the first subarray and the fourth subarray, the third subarray is disposed adjacent the first subarray and the fourth subarray, and the fourth subarray is disposed adjacent the second and the third subarray;

wherein the angle comprises a first angle component computed by the combining network as a sum of the difference between a sum of the first subarray analog RF output and the third subarray analog RF output, and a sum of the second subarray analog RF output and the fourth subarray analog RF output (A−C)+(B−D) and a second angle component computed as a difference of the sum of the first subarray analog RF output and the third subarray analog RF output and a sum o of the second subarray output and the fourth subarray output (A+C)−(B+D).

3. The apparatus of claim 2, wherein the combining network comprises:

a first hybrid combiner, having
    a first hybrid combiner first input coupled to the first subarray analog RF output (A);
    a first hybrid combiner second input coupled to the third subarray analog RF output (C);
    a first hybrid combiner first output producing a sum of the first subarray analog RF output and the third subarray analog RF output (A+C); and
    a first hybrid combiner second output producing a difference between the first subarray analog RF output and the third subarray analog RF output (A−C);

a second hybrid combiner having
    a second hybrid combiner first input coupled to the second subarray analog RF output (B);
    a second hybrid combiner second input coupled to the fourth subarray analog RF output (D);
    a second hybrid combiner first output producing a sum of the second subarray analog RF output and the fourth subarray analog RF output (B+D); and
    a second hybrid combiner second output producing a difference between the second subarray analog RF output and the fourth subarray analog RF output (B−D);

a third hybrid combiner having
    a third hybrid combiner first input coupled to the first hybrid combiner first output (A+C);
    a third hybrid combiner second input coupled to the second hybrid combiner first output (B+D);
    a third hybrid combiner first output producing a sum of the third hybrid combiner first input and the third hybrid combiner second input (A+B)+(C+D);
    a third hybrid combiner second output producing a difference of the third hybrid combiner first input and the third hybrid combiner second input (A+B)−(C+D);

a fourth hybrid combiner, having
    a fourth hybrid combiner first input coupled to the first hybrid combiner second output (A−C);
    a fourth hybrid combiner second input coupled to the second hybrid combiner second output (B−D);
    a fourth hybrid combiner output producing a sum of the fourth hybrid combiner first input and the fourth hybrid comber second input (A−C)+(B−D).

4. The apparatus of claim 2, further comprising
a fourth subarray, having
    a fifth group of elements, each element of the fifth group of elements for receiving the RF signal; and
    a fifth subarray summer, coupled to each of the elements in the fifth group of elements, the fifth subarray summer for generating a fifth subarray analog RF output (E) from the sum of the RF signals received by each of the elements in the fifth group of elements;

a sixth subarray, having
    a sixth group of elements, each element of the sixth group of elements for receiving the RF signal; and
    a sixth subarray summer, coupled to each of the elements in the first group of elements, the sixth array summer for generating a sixth subarray analog RF output (F) from the sum of the RF signals received by each of the elements in the sixth group of elements; and a seventh subarray, having
    a seventh group of elements, each element of the seventh group of elements for receiving the RF signal; and
    a seventh subarray summer, coupled to each of the elements in the seventh group of elements, the seventh subarray summer for generating a seventh subarray analog RF output (G) from the sum of the RF signals received by each of the elements in the seventh group of elements;

a eighth subarray, having
    a eighth group of elements, each element of the eighth group of elements for receiving the RF signal; and
    a eighth subarray summer, coupled to each of the elements in the first group of elements, the eighth array summer for generating a eighth subarray analog RF output (H) from the sum of the RF signals received by each of the elements in the eighth group of elements; and wherein
    the fourth subarray, the sixth subarray, the seventh subarray, and the eighth subarray are of (n×m) dimension wherein n is the number of rows of elements and m is the number of columns, and wherein n≧2 and m≧2;
    the fourth subarray is disposed adjacent the fourth subarray, the sixth subarray, and the seventh subarray, thy sixth subarray is disposed adjacent the fourth subarray and the eighth subarray, the seventh subarray is disposed adjacent the fourth subarray, the fourth subarray and the eighth subarray, and the eighth subarray is disposed adjacent the sixth and the seventh subarray;
    the first angle component is computed as difference of
        a sum of the difference between the first subarray analog RF output and the third subarray analog RF output, and a sum of the second subarray analog RF output and the fourth subarray analog RF output (A−C)+(B−D);
        a sum of a difference between the fifth subarray analog RF output and the seventh subarray analog RF output and a difference between the sixth subarray analog RF output and the eighth subarray analog RF output ((E−G)+(F−H); and
    the second angle component computed as a difference of
        a sum of the first subarray analog RF output and the second subarray analog RF output and a sum of the fifth subarray analog RF output and the sixth subarray analog RF output (A+B)+(E+F); and
        a sum of the third subarray analog RF output and the fourth subarray analog RE output and a sum of the seventh subway analog RF output and the eighth subarray analog RF output (C+D)+(G+H).

5. The apparatus of claim 1, further comprising:
a third subarray, having
    a third group of elements, each element of the third group of elements for receiving the RF signal; and
    a third subarray summer, coupled to each of the elements in the third group of elements, the third subarray summer for generating a third subarray analog RF output (C) from the sum of the RF Signals received by each of the elements in the third group of elements;

a fourth subarray, having
   a fourth group of elements, each element of the fourth group of elements for receiving the RF signal; and
   a fourth subarray summer, coupled to each of the elements in the first group of elements, the fourth array summer for generating a fourth subarray analog RF output (D) from the sum of the RF signals received by each of the elements in the fourth group of elements; and wherein the third subarray and the fourth subarray are of n×m dimension wherein n is the number of rows of elements and m is the number of columns, and wherein n≧2 and m≧2;

wherein the first subarray is disposed adjacent the second subarray and the third subarray, the second subarray is disposed adjacent the first subarray and the fourth subarray, the third subarray is disposed adjacent the first subarray and the fourth subarray, and the fourth subarray is disposed adjacent the second and the third subarray;

wherein the angle comprises a first angle component computed as a difference between the first subarray analog RF output and the fourth subarray analog RF output (A−D), and a second angle component computed as a difference between the second subarray analog RF output and the third subarray analog RF output (B−C).

6. The apparatus of claim 2, wherein the combining network comprises:
   a first hybrid combiner, having
      a first hybrid combiner first input coupled to the second subarray analog RF output (B);
      a first hybrid combiner second input coupled to the third subarray analog RF output (C);
      a first hybrid combiner first output producing a sum of the second subarray analog RF output and the third subarray output (B+C); and
      a first hybrid combiner second output producing a difference between the second subarray analog RF output and the third subarray analog RF output (B−C);
   a second hybrid combiner having
      a second hybrid combiner first input coupled to the first subarray analog RF output (A);
      a second hybrid combiner second input coupled to the fourth subarray analog RF output (D);
      a second hybrid combiner first output producing a sum of the first subarray analog RF output and the Fourth subarray analog RF output (A+D); and
      a second hybrid combiner second output producing a difference between the second subarray analog RF output and the fourth subarray analog RF output (B−D);
   a third hybrid combiner having
      a third hybrid combiner first input coupled to the first hybrid combiner first output (B+C);
      a third hybrid combiner second input coupled to the second hybrid combiner first output (A+D);
      a third hybrid combiner first output producing a sum of the third hybrid combiner first input and the third hybrid combiner second input (A+B)+(C+D).

7. The apparatus of claim 1, further comprising:
an array controller, coupled to the combining network, the array controller for generating a transmitting antenna command from a digitized version of the error signal to direct a transmitting antenna sensitive axis toward the source.

8. The apparatus of claim 1, wherein the first subarray and the second subarray are of (n×m) dimension wherein n is the number of rows of elements and m is the number of columns, and wherein n≧2 and m≧.

9. In a phased array antenna disposed in a plane, a method for receiving a radio frequency signal transmitted from a source offset from a boresight vector extending from the plane and concurrently generating an analog RF error signal proportional to the angle, comprising:
   summing an analog RF output of a first group of elements in a first subarray having (n×m) elements wherein n≧2 and m≧2;
   summing an analog RF output of a second group of elements in a second subarray having (n×m) elements wherein n≧2 and m≧2;
   summing the analog RF output of the first group of elements in the first subarray and the analog RF output of the second group of elements in the second subarray to produce an analog RF array output representing the received radio frequency signal; and
   differencing the analog RF output of the first group of elements in the first subarray and the analog RF output of the second group of elements in the second subarray to generate the analog RF error signal;
   receiving the analog RF first array output with a first receiver to generate an output signal;
   receiving the analog RF error signal output with a second receiver generate a received error signal;
   generating a transmitting antenna command from a digitized version of the received error signal to direct a transmitting antenna sensitive axis toward the source.

10. The method of claim 9, wherein:
the method further comprises the steps of:
   summing an analog RF output of a third group of elements in a third subarray having (n×m) elements wherein n≧2 and m≧2;
   summing an analog RF output of a fourth group of elements in a fourth subarray having (n×in) elements wherein n≧2 and m≧2;
the step of summing the analog RF output of the first group of elements in the first subarray and the analog RF output of the second group of elements in the second subarray to produce an analog RF array output representing the received radio frequency signal comprises the step of
   summing the analog RF output of the first group of elements in the first subarray, the analog RF output of the second group of elements in the second subarray, the analog RF output of the third group of elements in the third subarray, and the analog RF output of the fourth group of elements in the fourth subarray;
the analog RF error signal comprises a first angle component and a second angle component and the step of differencing the analog RF output of the first group of elements in the first subarray and the analog RF output of the second group of elements in the second subarray to generate the error signal comprises the step of
   summing a difference between the analog RF output of the first group of elements in the first subarray and the analog RF output of the third group of elements in the third subarray, and the difference between the analog RF output of the second group of elements in the second subarray and the analog RF output of the fourth group of elements in the fourth subarray to generate the first angle component; and
   differencing a sum of the analog RF output of the first group of elements in the first subarray and the analog RF output of the third group of elements in the third subarray, and a sum of the analog RF output of the second group of elements in the second subarray and the analog RF output of the fourth group of elements in the fourth subarray to generate the first angle component.

11. The method of claim 9, wherein:
the method further comprises the steps of:
summing an analog RF output of a third group of elements in a third subarray having (n×m) elements wherein n≧2 and m≧2;
summing an analog RF output of a fourth group of elements in a fourth subarray having (n×m) elements wherein n≧2 and m≧2;
summing an analog RF output of a fifth group of elements in a fourth subarray having (n×m) elements wherein n≧2 and m≧2;
summing an analog RF output of a sixth group of elements in a sixth subarray having (n×m) elements wherein n≧2 and m≧2;
summing an analog RF output of a seventh group of elements in a seventh subarray having (n×m) elements wherein n≧2 and m≧2;
summing an analog RF output of an eighth group of elements in an eighth subarray having (n×m) elements wherein n≧2 and m≧2;
the step of summing the analog RF output of the first group of elements in the first subarray and the analog RF output of the second group of elements in the second subarray to produce an array comprises the step of
summing the analog RF output of the first group of elements in the first subarray, the analog RF output of the second group of elements in the second subarray, the analog RF output of the third group of elements in the third subarray, the analog RF output of the fourth group of elements in the fourth subarray, the analog RF output of the fifth group of elements in the fifth subarray, the analog RF output of the sixth group of elements in the sixth subarray, the analog RF output of the seventh group of elements in the seventh subarray, and the analog RF output of the eighth group of elements in the eighth subarray;
the analog RF error signal comprises a first angle component and a second angle component and the step of differencing the analog RF output of the first group of elements in the first subarray and the analog RF output of the second group of elements in the second subarray to generate the error signal comprises the steps of
summing a difference between the analog RF output of the first group of elements in the first subarray and the analog RF output of the third group of elements in the third subarray, the difference between the analog RF output of the second group of elements in the second subarray and the analog RF output of the fourth group of elements in the fourth subarray; a difference between the analog RF output of the fifth group of elements in the fifth subarray and the analog RF output of the seventh group of elements in the seventh subarray, and a difference between the analog RF output of the sixth group of elements in the sixth subarray and the analog RF output of the eighth group of elements in the eighth subarray to generate the first angle component; and
differencing a sum of the analog RF output of the first group of elements in the first subarray and the analog RF output of the third group of elements in the third subarray, a sum of the analog RF output of the second group of elements in the second subarray and the analog RF output of the fourth group of elements in the fourth subarray, a sum of the analog RF output of the fifth group of elements in the fifth subarray and the analog RF sixth group of elements in the sixth subarray; and a sum of the analog RF output of the seventh group of elements in the seventh subarray and the analog RF eighth group of elements in the eighth subarray to generate the first angle component.

12. The method of claim 9, wherein:
the method further comprises the steps of:
summing an analog RF output of a third group of elements in a third subarray having (n×m) elements wherein n≧2 and m≧2;
summing an analog RF output of a fourth group of elements in a fourth subarray having (n×m) elements wherein n≧2 and m≧2;
the step of summing the analog RF output of the first group of elements in the first subarray and the analog RF output of the second group of elements in the second subarray to produce an array comprises the step of
summing the analog RF output of the first group of elements in the first subarray, the analog RF output of the second group of elements in the second subarray, the analog RF output of the third group of elements in the third subarray, and the analog RF output of the fourth group of elements in the fourth analog subarray;
the analog RF error signal comprises a first angle component and a second angle component and the step of differencing the analog RF output of the first group of elements in the first subarray and the analog RF output of the second group of elements in the second subway to generate the analog RF error signal comprises the step of:
differencing the analog RF output of the first group of elements in the first subarray and the analog RF output of the fourth group of elements in the fourth subarray to generate the first angle component and differencing the analog RF output of the second group of elements in the second array and the analog RF output of the third group of elements in the third array to generate the second angle component.

13. The method of claim 9, wherein the first subarray and the second subarray are of (n×m) dimension wherein n is the number of rows of elements and m is the number of columns, and wherein n≧2 and m≧2.

14. In a phased array antenna disposed in a plane, the phased array antenna for receiving a radio frequency signal transmitted from a source offset from a boresight vector extending from the plane, an apparatus for generating an analog RF error signal proportional to the angle, comprising:
means for summing an analog RF output of a first group of elements in a first subarray having (n×m) elements wherein n≧2 and m≧2;
means for summing an analog RF output of a second group of elements in a second subarray having (n×m) elements wherein n≧2 and m≧2;
means for summing the analog RF output of the first group of elements in the first subarray and the analog RF output of the second group of elements in the second subarray to produce an analog RF array output;
means for differencing the analog RF output of the first group of elements in the first subarray and the analog RF output of the second group of elements in the second subarray to generate the analog RF error signal and
means for receiving the first array analog RF output with a first receiver to generate an output signal;

means for receiving the analog RF error signal output with a second receiver generate a received error signal;

means for generating a transmitting antenna command from the received error signal to direct a transmitting antenna sensitive axis toward the source.

15. The apparatus of claim 14, wherein;

the apparatus further comprises:

means for summing an analog RF output of a third group of elements in a third subarray having (n×m) elements wherein n≧2 and m≧2;

means for summing an analog RF output of a fourth group of elements in a fourth subarray having (n×m) elements wherein n≧2 and m≧2;

the means for summing the analog RF output of the first group of elements in the first subarray and the analog RF output of the second group of elements in the second subarray to produce an array comprises:

means for summing the analog RF output of the first group of elements in the first subarray, the analog RF output of the second group of elements in the second subarray, the analog RF output of the third group of elements in the third subarray, and the analog RF output of the fourth group of elements in the fourth subarray;

the error signal comprises a first angle component and a second angle component and the means for differencing the analog RF output of the first group of elements in the first subarray and the analog RF output of the second group of elements in the second subarray to generate the error signal comprises:

means for summing a difference between the analog RF output of the first group of elements in the first subarray and the analog RF output of the third group of elements in the third subarray, and the difference between the analog RF output of the second group of elements in the second subarray and the analog RF output of the fourth group of elements in the fourth subarray to generate the first angle component; and means for differencing a sum of the analog RF output of the first group of elements in the first subarray and the analog RF output of the third group of elements in the third subarray, and a sum of the analog RF output of the second group of elements in the second subarray and the analog RF output of the fourth group of elements in the fourth subarray to generate the first angle component.

16. The apparatus of claim 14, wherein:

the apparatus further comprises:

means for summing an analog RF output of a third group of elements in a third subarray having (n×m) elements wherein n≧2 and m≧2;

means for summing an analog RF output of a fourth group of elements in a fourth subarray having (n×m) elements wherein n≧2 and m≧2;

means for summing an analog RF output of a fifth group of elements in a fifth subarray having (n×m) elements wherein n≧2 and m≧2;

means for summing an analog RF output of a sixth group of elements in a sixth subarray having (n×m) elements wherein n≧2 and m≧2;

means for summing an analog RF output of a seventh group of elements in a seventh subarray having (n×m) elements wherein n≧2 and m≧2;

means for summing an analog RF output of an eighth group of elements in an eighth subarray having (n×m) elements wherein n≧2 and m≧2;

the means for summing the analog RF output of the first group of elements in the first subarray and the analog RF output of the second group of elements in the second subarray to produce an array comprises:

means for summing the analog RF output of the first group of elements in the first subarray, the analog RF output of the second group of elements in the second subarray, the analog RF output of the third group of elements in the third subarray, the analog RF output of the fourth group of elements in the fourth subarray, the analog RF output of the fifth group of elements in the fifth subarray, the analog RF output of the sixth group of elements in the sixth subarray, the analog RF output of the seventh group of elements in the seventh subarray, and the analog RF output of the eighth group of elements in the eighth subarray;

the error signal comprises a first angle component and a second angle component and the step of differencing the analog RF output of the first group of elements in the first subarray and the analog RF output of the second group of elements in the second subarray to generate the error signal comprises:

means for summing a difference between the analog RF output of the first group of elements in the first subarray and the analog RF output of the third group of elements in the third subarray, the difference between the analog RF output of the second group of elements in the second subarray and the analog RF output of the fourth group of elements in the fourth subarray, a difference between the analog RF output of the fifth group of elements in the fifth subarray and the analog RF output of the seventh group of elements in the seventh subarray, and a difference between the analog RF output of the sixth group of elements in the sixth subarray and the analog RF output of the eighth group of elements in the eighth subarray to generate the first angle component; and means for differencing a sum of the analog RF output of the first group of elements in the first subarray and the analog RF output of the third group of elements in the third subarray, a sum of the analog RF output of the second group of elements in the second subarray and the analog RF output of the fourth group of elements in the fourth subarray, a sum of the analog RF output of the fifth group of elements in the fifth subarray and the analog RF output of the sixth group of elements in the sixth subarray, and a sum of the analog RF output of the seventh group of elements in the seventh subarray and the analog RF output of the eighth group of elements in the eighth subarray to generate the first angle component.

17. The apparatus of claim 14, wherein:

the apparatus further comprises:

means for summing an analog RF output of a third group of elements in a third subarray having (n×m) elements wherein n≧2 and m≧2;

means for summing an analog RF output of a fourth group of elements in a fourth subarray having (n×m) elements wherein n≧2 and m≧2;

the means for summing the analog RF output of the first group of elements in the first subarray and the analog RF output of the second group of elements in the second subarray to produce an array comprise;

means for summing the analog RF output of the first group of elements in the first subarray, the analog RF output of the second group of elements in the second subarray, the analog RF output of the third group of elements in the third subarray, and the analog RF output of the fourth group of elements in the fourth subarray;

the error signal comprises a first angle component and a second angle component and the means for differencing the analog RF output of the first group of elements in the first subarray and the analog RF output of the second group of elements in the second subarray to generate the analog RF error signal comprises;

means for differencing the analog RF output of the first group of elements in the first subarray and the analog RF output of the fourth group of elements in the fourth subarray to generate the first angle component and differencing the analog RF output of the second group of elements in the second array and the analog RF output of the third group of elements in the third array to generate the second angle component.

* * * * *